US012645227B2

(12) United States Patent
Borgstadt

(10) Patent No.: US 12,645,227 B2
(45) Date of Patent: Jun. 2, 2026

(54) GENERATING AN OBJECT MAP FOR USE IN A VEHICLE NAVIGATION SYSTEM

(71) Applicant: Deere & Company, Moline, IL (US)

(72) Inventor: Justin A. Borgstadt, West Des Moines, IA (US)

(73) Assignee: Deere & Company, Moline, IL (US)

( * ) Notice: Subject to any disclaimer, the term of this patent is extended or adjusted under 35 U.S.C. 154(b) by 239 days.

(21) Appl. No.: 18/366,955

(22) Filed: Aug. 8, 2023

(65) Prior Publication Data

US 2025/0053174 A1 Feb. 13, 2025

(51) Int. Cl.
| | |
|---|---|
| *G05D 1/622* | (2024.01) |
| *G01C 21/00* | (2006.01) |
| *G05D 1/00* | (2024.01) |
| *G05D 1/243* | (2024.01) |
| *G05D 1/246* | (2024.01) |
| *G05D 105/15* | (2024.01) |

(Continued)

(52) U.S. Cl.
CPC ......... *G05D 1/622* (2024.01); *G01C 21/3804* (2020.08); *G01C 21/3826* (2020.08); *G05D 1/0246* (2013.01); *G05D 1/0274* (2013.01); *G05D 1/2435* (2024.01); *G05D 1/2465* (2024.01); *G06V 20/56* (2022.01); *G05D 2105/15* (2024.01); *G05D 2107/21* (2024.01)

(58) Field of Classification Search
CPC .... G05D 1/622; G05D 1/0246; G05D 1/0274; G05D 1/2435; G05D 1/2465; G05D 2105/15; G05D 2107/21; G01C 21/3804; G01C 21/3826; G06V 20/56
See application file for complete search history.

(56) References Cited

U.S. PATENT DOCUMENTS

| | | | | |
|---|---|---|---|---|
| 10,713,484 B2 * | 7/2020 | Polzounov | ............... | G06N 3/08 |
| 11,041,730 B2 * | 6/2021 | Colgate | .............. | G01C 21/3896 |

(Continued)

FOREIGN PATENT DOCUMENTS

| | | | | |
|---|---|---|---|---|
| EP | 1473673 A2 * | 11/2004 | ............. | G01C 23/00 |

OTHER PUBLICATIONS

Extended European Search Report and Written Opinion issued in European Patent Application No. 24185177.3 dated Nov. 11, 2024, in 09 pages.

(Continued)

*Primary Examiner* — Dale W Hilgendorf
(74) *Attorney, Agent, or Firm* — Fenwick & West LLP

(57) ABSTRACT

A construction vehicle generates an object map to facilitate navigation. The construction vehicle captures an image of the area behind the construction vehicle, and generates a disparity image reflecting depth behind the construction vehicle. The construction vehicle generates and processes a 3D point cloud representation of the area behind the construction vehicle to identify a ground plane. The construction vehicle dynamically generates a virtual plane parallel to the ground plane based on the movement and position of the construction vehicle. After applying the virtual plane to the disparity image, the construction vehicle generates an object map identifying locations of objects greater than a threshold size and the height of the virtual plane. The construction vehicle navigates through the area behind the construction vehicle using the generated object map.

18 Claims, 7 Drawing Sheets

Captured Image 410 415

419
417

Disparity Image 420

425
427

3D Point Cloud 430

Ground Plane 435

Object Map 440 415

417

(51) Int. Cl.
   *G05D 107/20* (2024.01)
   *G06V 20/56* (2022.01)

(56) References Cited

U.S. PATENT DOCUMENTS

| | | | | |
|---|---|---|---|---|
| 11,367,207 | B2 * | 6/2022 | Fu | A01C 23/007 |
| 11,771,077 | B2 * | 10/2023 | Fu | G06V 10/762 |
| | | | | 47/1.7 |
| 2004/0264761 | A1 * | 12/2004 | Mas | G06T 7/593 |
| | | | | 382/154 |
| 2012/0185094 | A1 * | 7/2012 | Rosenstein | B25J 5/007 |
| | | | | 901/1 |
| 2014/0180549 | A1 * | 6/2014 | Siemens | A01B 39/18 |
| | | | | 701/50 |
| 2015/0178884 | A1 * | 6/2015 | Scholl | G06T 7/33 |
| | | | | 382/104 |
| 2016/0350930 | A1 * | 12/2016 | Lin | G06V 20/70 |
| 2017/0220877 | A1 * | 8/2017 | Kakegawa | G08G 1/166 |
| 2017/0371347 | A1 * | 12/2017 | Cohen | G05D 1/0088 |
| 2019/0258878 | A1 * | 8/2019 | Koivisto | G01S 7/417 |
| 2021/0158041 | A1 * | 5/2021 | Chowdhary | G06V 20/188 |
| 2021/0264624 | A1 * | 8/2021 | Fu | G06V 30/248 |
| 2022/0207852 | A1 * | 6/2022 | Sharma | G06V 20/188 |
| 2022/0265110 | A1 * | 8/2022 | Molina Cabrera | |
| | | | | A47L 11/4038 |

OTHER PUBLICATIONS

Johnson, D. et al. "Development and implementation of a team of robotic tractors for autonomous peat moss harvesting," *Journal of Field Robotics*, vol. 26, No. 6-7, Jun. 2009, pp. 549-571.

* cited by examiner

3D Point Cloud 430

Ground Plane 435

Object Map 440

417

415

Captured Image 410

415

419

417

Disparity Image 420

425

427

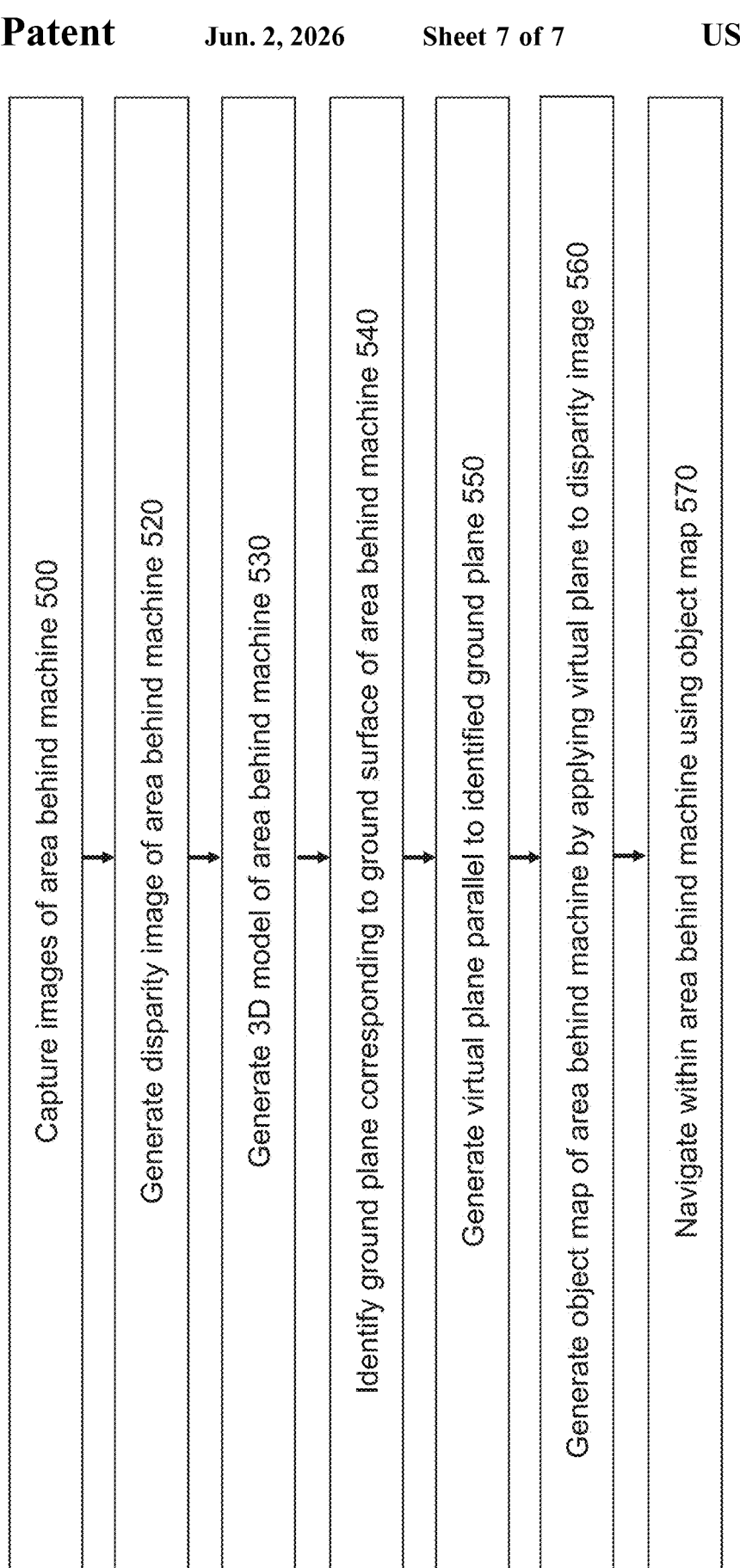

Capture images of area behind machine 500

Generate disparity image of area behind machine 520

Generate 3D model of area behind machine 530

Identify ground plane corresponding to ground surface of area behind machine 540

Generate virtual plane parallel to identified ground plane 550

Generate object map of area behind machine by applying virtual plane to disparity image 560

Navigate within area behind machine using object map 570

FIG. 5

GENERATING AN OBJECT MAP FOR USE IN A VEHICLE NAVIGATION SYSTEM

BACKGROUND

Field of Disclosure

This disclosure relates to a vehicle navigation system, and, more specifically, generating an object map for use in the vehicle navigation system.

Description of the Related Art

Machines, such as farming machines and construction vehicles, complete objectives in an area, such as depositing seeds and transporting material, respectively. Conventionally, these machines use data gathered by sensors on the machine to determine instructions for the traversing the area, while completing the objectives. While traversing the area, a machine may encounter objects that may obstruct the machine's movement. There is a particularly high risk of accidents when the machine is moving in reverse, since an operator of the machine often does not have visibility of an area behind the machine. Collisions with objects can cause damage to the machine, hinder its progress in completing its objectives, as well as harm other individuals on site. Accordingly, there is a need for the machine to employ object detection methods to identify obstructions in areas behind the machine.

SUMMARY

A construction vehicle includes a set of cameras on a rear side of the construction vehicle. The set of cameras captures a set of images of an area behind the construction vehicle. The construction vehicle generates a disparity image of the area behind the construction vehicle by combining the set of images, where each pixel of the disparity image represents a distance between the construction vehicle and a portion of the area behind the construction vehicle. The construction vehicle generates a three dimensional (3D) point cloud comprising a 3D model of the area behind the construction vehicle. By performing a random sample consensus (RANSAC) operation on the 3D point cloud, the construction vehicle identifies a ground plane corresponding to a ground surface of the area behind the construction vehicle. The construction vehicle generates a virtual plane (or planes) parallel to the identified ground plane at heights above and/or below the ground plane. The heights are based on a combination of a maximum clearance height under the construction vehicle, a maximum vehicle operational pitch angle, and the height, location, and orientation of the identified ground plane relative to the construction vehicle. The construction vehicle generates an object map by applying the virtual planes to the disparity image, the object map identifying a location, within the area behind the construction vehicle, of each object having an above threshold size and height greater than the virtual plane (or, for sub-surface virtual planes, lower than the virtual plane). The construction vehicle navigates the area behind the construction vehicle using the generated object map.

BRIEF DESCRIPTION OF DRAWINGS

FIG. 5 illustrates a process for generating an object map for use in a machine navigation system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A machine, such as a farming machine or construction vehicle, performs actions in an area through which the machine moves. While the following description refers to a machine that performs farming actions in a field, the methods described herein are also applicable to construction vehicles and other machines.

A machine includes one or more sensors capturing information about a field and/or area through which the machine moves. Traditionally, image data captured of a field includes objects that a machine may encounter as it traverses the field. Such objects may include rocks, workers, farm animals, buildings, and the like. Some objects may be obstructions that block the machine from traversing portions of the field. Commonly, these obstructions are large objects, such as rocks, people, and the like, that the machine needs to avoid. In contrast, the machine may not need to reroute its path through the field to avoid some small objects. For example, a machine may easily move over a small rock, tumbleweed, or pile of dirt. However, from a vantage point of the machine in the field, it may be difficult to determine from image data captured by the machine whether an object is an obstruction or not. For instance, a rock placed 40 feet from the machine will look larger in the image data than the same rock placed 100 feet from the machine.

The machine includes a control system that processes the images obtained by the sensors to identify obstructions in the field. The control system generates an object map after processing the images, where the object map identifies certain objects as well as their locations in the area behind the machine. The control system navigates the machine based on the object map. The control system, in some embodiments, may also execute an action for the machine to avoid the obstruction in the field. In some examples, the control system controls the machine to move around the obstruction in the field or alters the movement of the machine to avoid the obstruction in the field. Accordingly, the methods described herein can improve the machine's performance, mobility, and the safety of the area around the machine.

II. MACHINE CONFIGURATIONS

II.A Example Machine

Figure 1A:
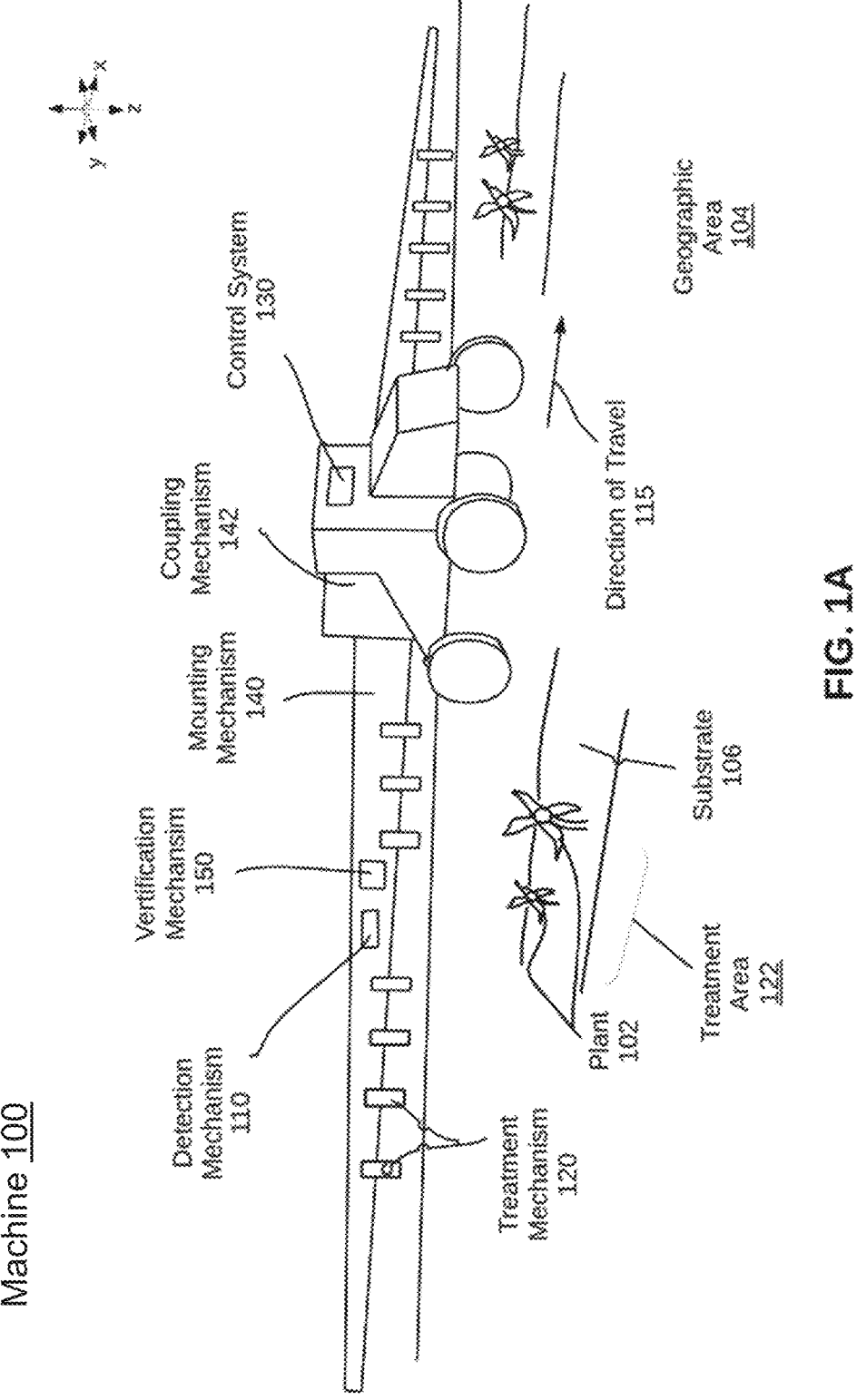
FIG. 1A illustrates an isometric view of a machine, in accordance with an embodiment.
Figure 1B:
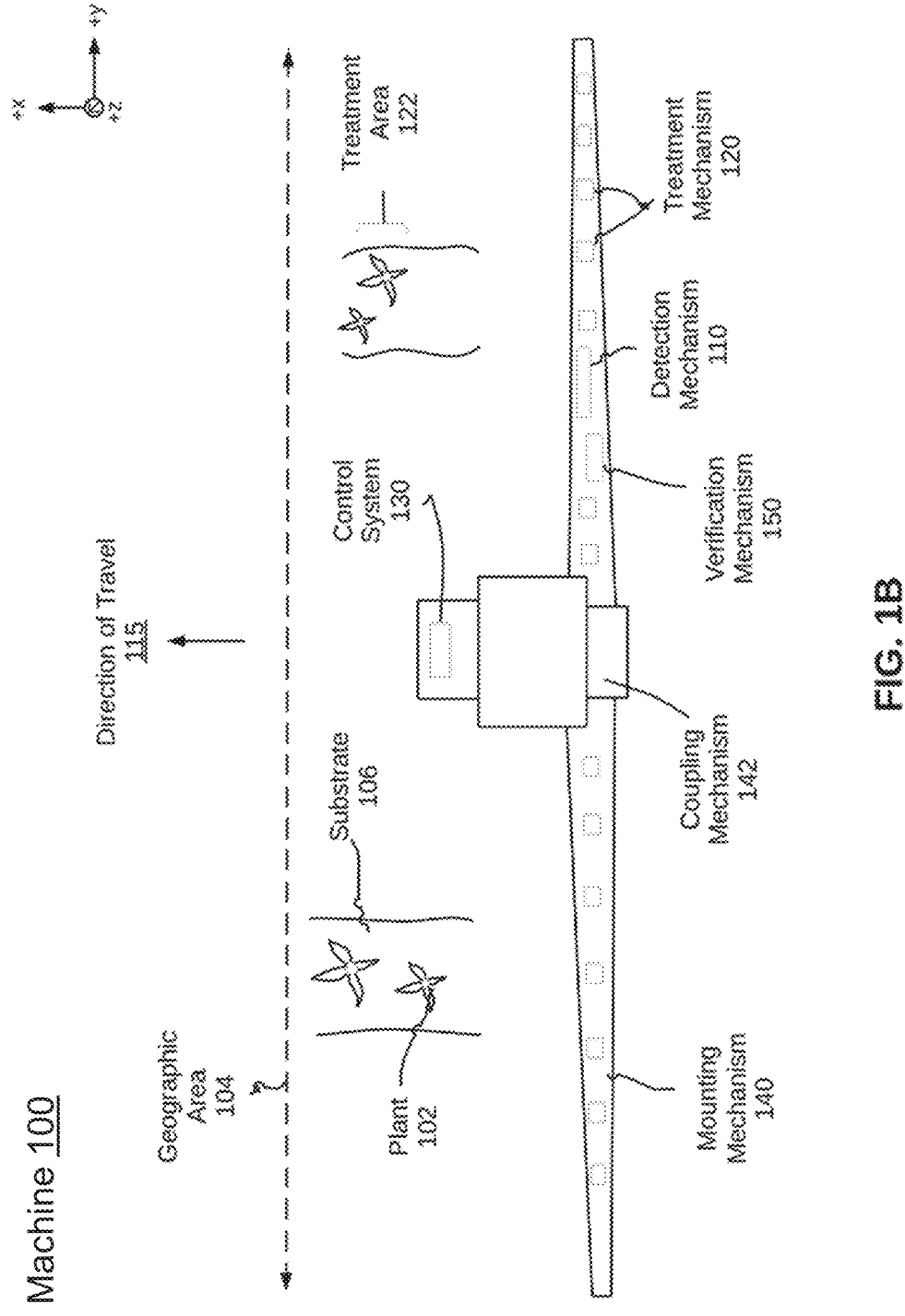
FIG. 1B illustrates a top view of the machine, in accordance with an embodiment.
Figure 1C:
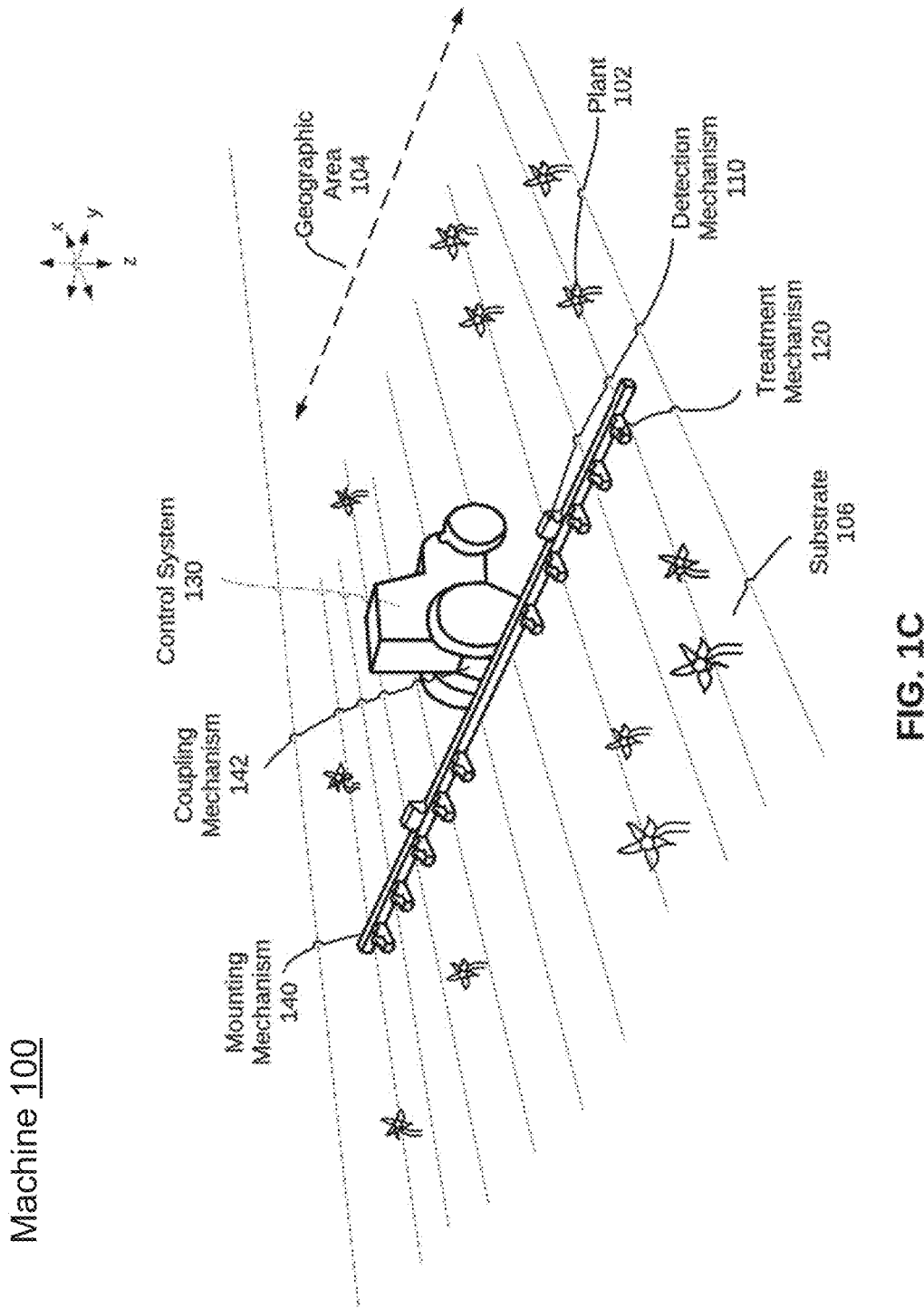
FIG. 1C illustrates an isometric view of the machine, in accordance with an embodiment.

FIGS. 1A-C illustrate various views of a machine, in accordance with one or more embodiments. In particular, FIGS. 1A-C refer to a farming machine that identifies and treats plants may have a variety of configurations, some of which are described in greater detail below. Other embodiments of machines are also possible. For example, a construction vehicle may include components and perform functions substantially similar to what is described with respect to FIGS. 1A-C.

The machine 100, illustrated in FIGS. 1A-1C, includes a detection mechanism 110, a treatment mechanism 120, and a control system 130. The machine 100 can additionally include a mounting mechanism 140, a verification mechanism 150, a power source, digital memory, communication apparatus, or any other suitable component. The machine 100 can include additional or fewer components than described herein. Furthermore, the components of the machine 100 can have different or additional functions than described below.

The machine 100 functions to apply a treatment to one or more plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent to the plant.

The plants 102 can be crops but can alternatively be weeds or any other suitable plant. The crop may be cotton, but can alternatively be lettuce, soybeans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g., same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior to the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil but can alternatively be a sponge or any other suitable substrate.

The detection mechanism 110 is configured to identify a plant for treatment, as well as objects in the field. As such, the detection mechanism 110 can include one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. In one embodiment, and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the machine 100 moves through the geographic location. However, in some embodiments, the detection mechanism 110 traverses over a geographic location at substantially the same time as the treatment mechanism 120. In an embodiment of the machine 100, the detection mechanism 110 is statically mounted to the mounting mechanism 140 proximal the treatment mechanism 120 relative to the direction of travel 115. In other systems, the detection mechanism 110 can be incorporated into any other component of the machine 100. In some embodiments, the detection mechanism 110 is placed at the rear of the machine 100.

The treatment mechanism 120 functions to apply a treatment to an identified plant 102. The treatment mechanism 120 applies the treatment to the treatment area 122 as the machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. In one embodiment, the treatment mechanisms 120 are an array of spray treatment mechanisms. The treatment mechanisms 120 may be configured to spray one or more of: an herbicide, a fungicide, water, or a pesticide. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The machine 100 may include one or more treatment mechanisms 120. A treatment mechanism 120 may be fixed (e.g., statically coupled) to the mounting mechanism 140 or attached to the machine 100 relative to the detection mechanism 110. Alternatively, the treatment mechanism 120 can rotate or translate relative to the detection mechanism 110 and/or mounting mechanism 140. In one variation, the machine 100 includes a single treatment mechanism, wherein the treatment mechanism 120 is actuated or the machine 100 moved to align the treatment mechanism 120 active area 122 with the targeted plant 102. In a second variation, the machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation, such as shown in FIGS. 1A-1C, the machine 100 includes an array of treatment mechanisms 120, wherein the treatment mechanisms 120 are actuated or the machine 100 is moved to align the treatment mechanism 120 active areas 122 with the targeted plant 102 or plant segment.

The machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be a computer. The control system 130 can apply one or more models to determine a detection ground plane of the field and identify one or more obstructions in the field. In some embodiments, the control system applies an obstruction identification model to identify obstructions, which is described in greater detail below. The control system 130 may be coupled to the machine 100 such that a user (e.g., an operator) can interact with the control system 130. In other embodiments, the control system 130 is physically removed from the machine 100 and communicates with system components (e.g., detection mechanism 110, treatment mechanism 120, etc.) wirelessly. In some embodiments, the control system 130 is an umbrella term that includes multiple networked systems distributed across different locations (e.g., a system on the machine 100 and a system at a remote location). In some embodiments, one or more processes are performed by another control system. For example, the control system 130 may receive plant treatment instructions from another control system.

In some configurations, the machine 100 includes a mounting mechanism 140 that functions to provide a mounting point for the system components. In one example, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame but can alternatively be any other suitable mounting mechanism. In the embodiment of FIGS. 1A-1C, the mounting mechanism 140 extends outward from a body of the machine 100 in the positive and negative y-direction (in the illustrated orientation of FIGS. 1A-1C) such that the mounting mechanism 140 is approximately perpendicular to the direction of travel 115. The mounting mechanism 140 in FIGS. 1A-1C includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the machine 100.

The machine 100 includes a first set of coaxial wheels and a second set of coaxial wheels, wherein the rotational axis of the second set of wheels is parallel with the rotational axis of the first set of wheels. In some embodiments, each wheel in each set is arranged along an opposing side of the mounting mechanism 140 such that the rotational axes of the wheels are approximately perpendicular to the mounting mechanism 140. In FIGS. 1A-1C, the rotational axes of the wheels are approximately parallel to the mounting mechanism 140. In alternative embodiments, the system can include any suitable number of wheels in any suitable configuration. The machine 100 may also include a coupling mechanism 142, such as a hitch, that functions to removably or statically couple to a drive mechanism, such as a tractor, more to the rear of the drive mechanism (such that the machine 100 is dragged behind the drive mechanism), but can alternatively be attached to the front of the drive mechanism or to the side of the drive mechanism. Alternatively, the machine 100 can include the drive mechanism (e.g., a motor and drive train coupled to the first and/or second set of wheels). In other example systems, the system may have any other means of traversing through the field.

In some configurations, the machine 100 additionally includes a verification mechanism 150 that functions to record a measurement of the ambient environment of the machine 100. The machine 100 may use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) to the detection mechanism 110 or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the machine 100, the verification mechanism 150 can be included in other components of the system.

In some configurations, the machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the machine 100.

In some configurations, the machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., BLUETOOTH®, NFC, etc.), or any other suitable communication system.

II.B System Environment

Figure 2:
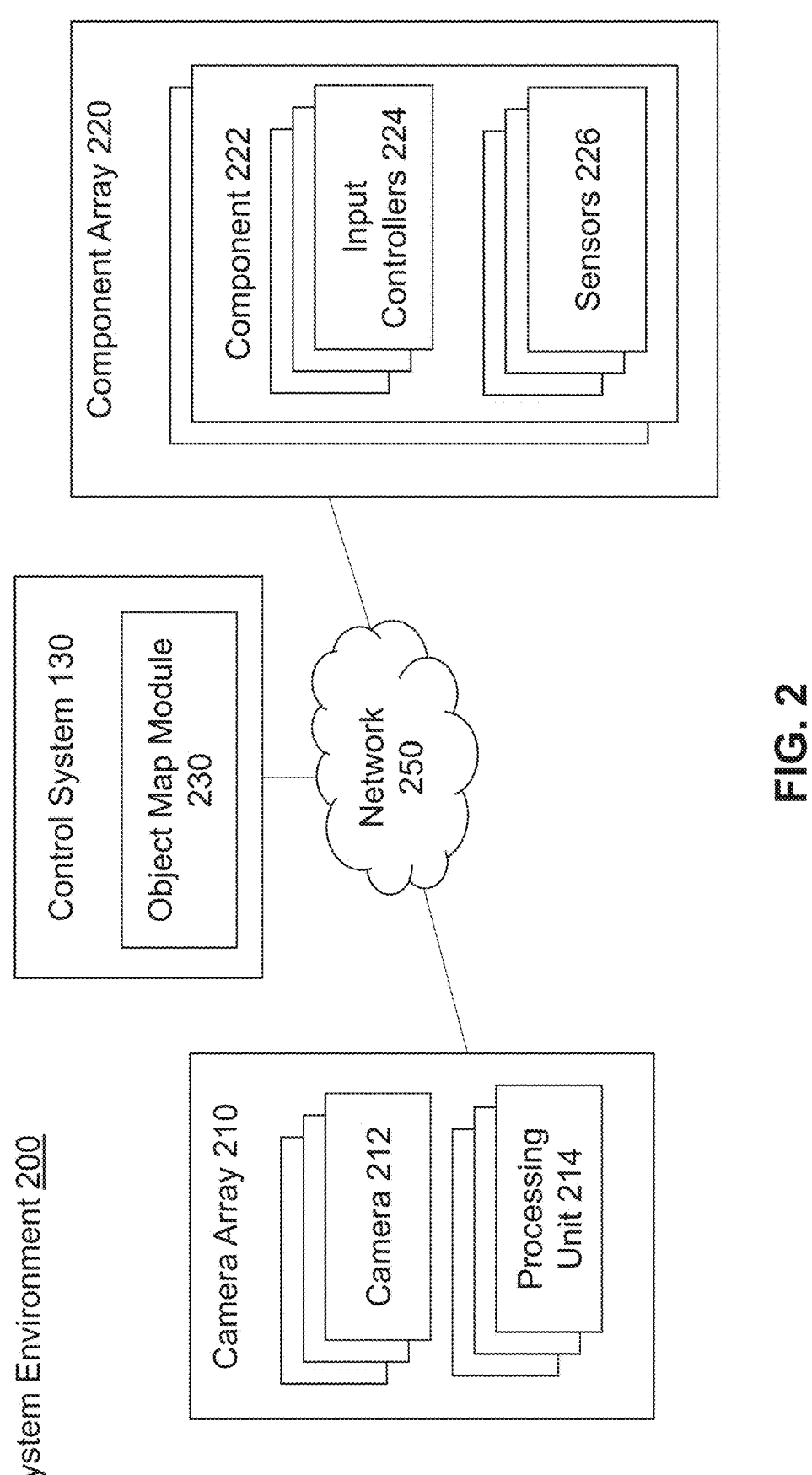
FIG. 2 is a block diagram of a system environment of the machine, in accordance with an embodiment.

FIG. 2 is a block diagram of a system environment 200 of the machine 100, in accordance with an embodiment. In this example, the control system 130 is connected to a camera array 210 and component array 220 via a network 250 within the system environment 200.

The camera array 210 includes one or more cameras 212. The cameras 212 may be a detection mechanism 110 as described in FIG. 1. Each camera 212 in the camera array 210 may be controlled by a corresponding processing unit 214 (e.g., a graphics processing unit). In some examples, more than one camera 212 may be controlled by a single processing unit 214. The array 210 captures image data of the scene around the machine 100. The captured image data may be sent to the control system 130 via the network 250 or may be stored or processed by other components of the machine 100.

The component array 220 includes one or more components 222. Components 222 are elements of the machine that can take farming actions (e.g., a treatment mechanism 120) and/or construction actions (e.g., laying a foundation, clearing ground material, excavating, filling, and so on). As illustrated, each component has one or more input controllers 224 and one or more sensors 226, but a component may include only sensors or only input controllers. An input controller controls the function of the component. For example, an input controller may receive machine commands via the network and actuate the component in response. A sensor 226 generates measurements within the system environment. The measurements may be of the component, the machine, or the environment surrounding the machine. For example, a sensor 226 may measure a configuration or state of the component 222 (e.g., a setting, parameter, power load, etc.), or measure an area surrounding a machine (e.g., moisture, temperature, etc.).

The control system 130 receives information from the camera array 210 and component array 220 and generates machine actions. In particular, the control system 130 employs an object map module 230 to identify objects in an area behind the machine 100.

The object map module 230 processes a set of images from the camera array 210, for instance from behind the machine 100 for vehicles traveling backwards/traveling in reverse, or from in front of the machine for vehicles traveling forwards. The object map module 230 identifies a ground plane from the set of images, as well as a virtual plane based on features of the machine 100. The object map module 230 generates an object map that identifies objects of greater than a threshold size and greater than a height of the virtual plane. The control system 130 instructs the machine 100 to move around the field based on the object map. The object map module 230 is further described with respect to FIG. 3.

In some embodiments, the information from the camera array 210 may be image data describing a portion of a field (henceforth referred to as a "field portion") based on the farming machine's 100 location within the field. For example, the image data may correspond to location determined from a Global Position System (GPS) of the machine 100. Therefore, the image data comprises pixels, and each pixel may be associated with 3D coordinates representing a location in the field portion. In some embodiments, the field portion is an area behind the machine 100.

The network 250 connects nodes of the system environment 200 to allow microcontrollers and devices to communicate with each other. In some embodiments, the components are connected within the network as a Controller Access Network (CAN). In this case, within the CAN each element has an input and output connection, and the CAN can translate information between the various elements. For example, the CAN receives input information from the camera array 210 and component array 220, processes the information, and transmits the information to the control system 130. The control system 130 generates actions based on the information and transmits instructions to implement the action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

III. GENERATING AN OBJECT MAP

Figure 3:
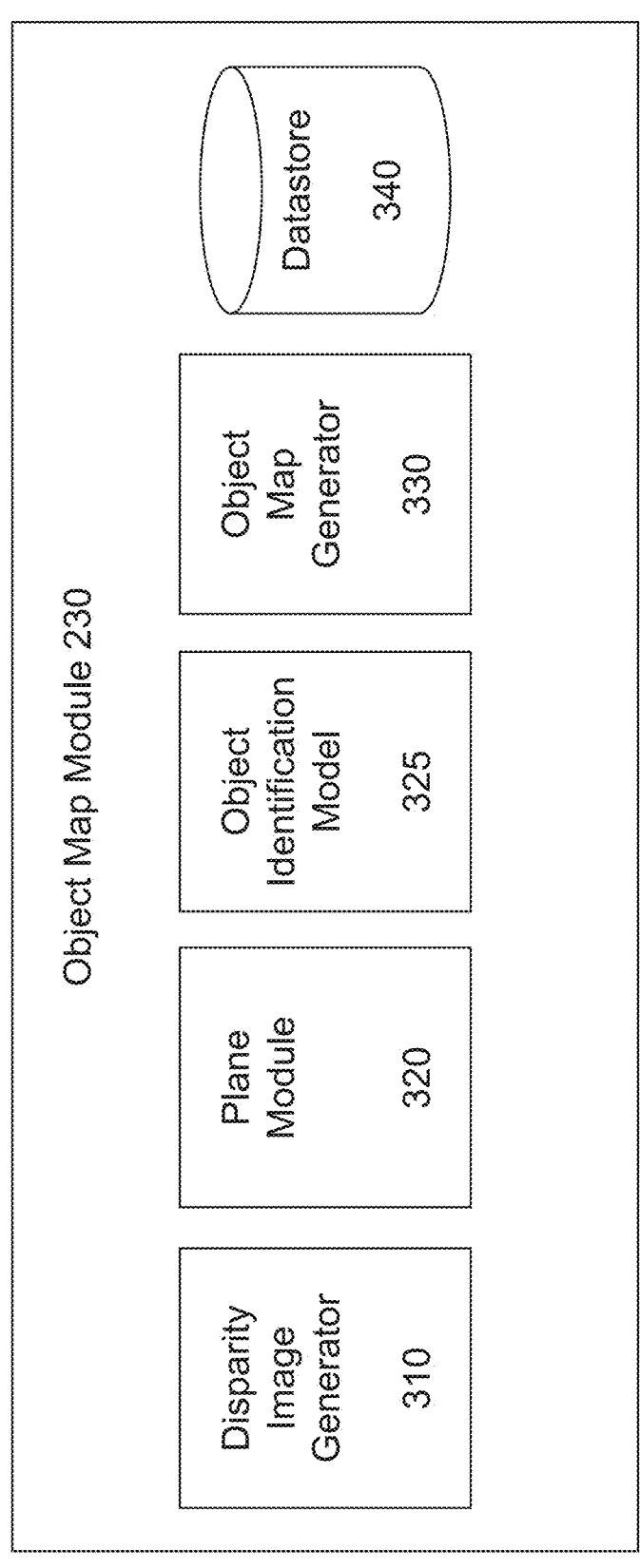
FIG. 3 is a block diagram of an object map module, in accordance with an embodiment.

As described above, the control system 130 employs an object map module 230 to identify objects in an area behind the machine 100. FIG. 3 is a block diagram of the object map module 230, in accordance with an embodiment. As described above, the object map module 230 generates an object map of objects in the area behind the machine 100, identifying a location of each object. The object map module 230 includes a disparity image generator 310, a plane module 320, an object identification model 325, an object map generator 330, and a datastore 340. In other embodiments, the object map module 230 may include more or less modules that are applied in conjunction with one another to detect obstructions and determine actions for the machine 100 to avoid the obstructions in the field.

The disparity image generator 310 generates a disparity image of the area behind the machine 100. The disparity image generator 310 receives, in real time from the camera array 210, a set of images of the area behind the machine 100. The images taken by the camera array 210 may comprise a plurality of pixels (e.g., red, green, and blue pixels, or "RGB" pixels), which are processed by the disparity image generator 310 to create a 3D representation of the area behind the machine 100 (a "disparity image"). In particular, the disparity image generator 310 may associate each RGB pixel of the image data to GPS data describing the location of the machine 100 when the image data was taken and determines 3D coordinates for each RGB pixel based on the GPS data. This can be done with image data from a mono camera or multiple stereo cameras in the camera array 210.

This is described in related U.S. application Ser. No. 17/033,263, filed on Sep. 25, 2020, which is incorporated herein by reference in its entirety for all purposes. In other embodiments, the disparity image generator 310 associates image data pixels with locations using other localization techniques, for instance using a vehicle frame coordinate system to define locations relative to the vehicle.

The resulting disparity image captures a depth of the area behind the machine 100, where each pixel of the image represents a distance between the machine 100 and a portion of the area behind the machine 100. For example, depth may be represented by color and/or pattern, where pixels of the disparity image representing an area close to the machine 100 may be a different color than pixels representing an area a threshold distance away from the machine 100. In some embodiments, the disparity image generator 310 retrieves image data that already describes a 3D representation of the area behind the machine 100 from the datastore 340, for instance using geolocation or other location-identifying information. In these embodiments, the disparity image may have been previously captured in the field.

The plane module 320 detects a ground plane in the disparity image and generates a virtual plane parallel to the ground plane based on features of the machine 100. The ground plane is a plane in the area behind the machine 100 representing the ground. The plane module 320 may determine the detection ground plane in multiple ways. In one example, the plane module 320 generates a 3D point cloud from the disparity image, the 3D point cloud representing a 3D model of the area behind the machine 100. The plane module 320 applies random sample consensus (RANSAC) to the 3D point cloud to obtain the detection ground plane. When using RANSAC, the ground plane may be noisy (e.g., include small plants and other errors). To reduce the noise in the detection ground plane, the plane module 320 may perform one or more noise reduction image processing operations on the images, for instance to remove outlier information within the images. For example, the plane module 320 may convert the ground plane from its representation in the 3D point cloud to a 2D representation. Once the ground plane is represented in 2D, the plane module 320 fill in gaps in the converted ground plane. For example, the conversion may have caused the noisy areas to go unrepresented (or misrepresented) in the 2D representation, and the plane module 320 can extrapolate the ground plane to those areas. Afterwards, the plane module 320 converts the filled-in ground plane back to 3D. This 3D to 2D to 3D process reduces noise in the identified ground plane.

In a second example, the plane module 320 uses real-time pixel identification of ground pixels to determine the ground plane. The plane module 320 may identify ground pixels by color or by estimated distance of the pixels to the camera array 210. For example, the plane module 320 may identify plane-indicating pixels, which are pixels representing a part of the field typically classified as ground (i.e., grass or dirt), and classify those pixels as part of the ground plane. As an example, the plane module 320 can employ a model similar to that disclosed in U.S. application Ser. No. 16/126,842, filed on Sep. 10, 2018, which is incorporated herein by reference in its entirety for all purposes.

In a third example, the plane module 320 may use previously determined ground plane information for the area behind the machine 100 and/or the entirety of the field to determine the ground plane, for instance using geolocation or other location-identifying information. For example, the plane module 320 may use a previously determined ground plane retrieved from the datastore 340 and apply that ground plane to the current disparity image. Similarly, the plane module 320 may determine the ground plane using pixel detection on previously captured image data of the area behind the machine 100 and/or the entirety of the field and apply that ground plane to the current disparity image.

Determining and processing the ground plane through one of these three methods can be computationally expensive because it is applied to an entire image. Therefore, rather than determining the detection ground plane at a macro level as described, the plane module 320 may also use a seed segment to determine a ground plane. The seed segment is a portion of the image data showing the ground of the area behind the machine 100 and comprises a plurality of pixels representing the ground. The plane module 320 uses to determined seed segment to determine the ground plane of the area behind the machine 100.

The plane module 320 may obtain the seed segment using any of the methods previously described to determine the ground plane. That is, the plane module 320 employs the previous methods to determine a small segment of a ground plane in an image, rather than the entire ground plane in an image. For instance, the plane module 320 may obtain the seed segment by applying RANSAC to a portion of the 3D representation of the field portion, using real-time identification of ground pixels on a portion of the image data, or using a portion of a previously determined ground plane. In another example, the plane module 320 may receive, from a client device connected to the control system 130 via the network 250, a user selection of a set of pixels in the image data representing the ground plane.

The plane module 320 uses the seed segment to determine a ground plane of the field portion by extrapolating the seed segment to an entire ground plane. For instance, the plane module 320 expands the seed segment to include nearby pixels of similar color, pixels within a same shape, pixels within a cluster, or some other extrapolation method. The plane module 320 expands the seed segment into the ground plane until there are no more pixels directly next to pixels in the extrapolated seed segment in the frequency range of the color and within the threshold height. The plane module 320 may store the ground plane in the datastore 340 for future use in the field, for instance in conjunction with geolocation information or other location-identifying information.

In an example, the plane module 320 identifies a seed segment that is a small patch of brown pixels. The plane module 320 expands the seed segment to nearest neighbor pixels (or next-nearest neighbor pixels, etc.) that are within a frequency range of the colors in the seed segment. For example, the plane module 320 expands the seed segment to include surrounding pixels with lighter and dark brown pixels, but does not include blue pixels. The plane module 320 then stores the ground plane in the datastore 340.

The plane module 320 generates a virtual plane (or planes) parallel to the identified ground plane at a height above (and/or below) the ground plane. It should be noted that while sub-surface virtual planes can be generated to identify holes, ditches, or other voids that the machine 100 is unable to safely traverse according to the techniques described herein, much of the remainder of the description will be limited to above-surface virtual planes for the purposes of simplicity.

The plane module 320 determines the height of the virtual plane based on a combination of constraining geometric features of the machine 100. These features include a maximum clearance height under the machine 100, a maximum operational pitch angle of the machine 100, and the height, location, and orientation of the identified ground plane relative to the construction vehicle. The maximum pitch angle is based on the physical limitations of the machine's operational design, such as a height of a rear portion of the machine 100 and a location of the rear portion of the machine 100 relative to a wheel of the machine 100. In some embodiments, the maximum pitch angle is user- or operator-defined, is manufacturer-defined, and/or represents a pitch angle at which navigation or operation is no longer safe (e.g., a pitch angle that risks vehicle tipping). As the machine 100 travels over objects and/or terrain, the measured clearance height and/or measured pitch angle of the ground relative to the vehicle may change. Accordingly, the plane module 320 dynamically generates the virtual plane as the machine 100 traverses across the field and features of the environment within a vicinity of the machine change (e.g., the machine approaches new obstacles, ditches, and the like). In some embodiments, the user of the machine 100 may specify the virtual plane.

In some embodiments, the height of the virtual plane may additional be computed based on a track width of the machine 100. As used herein, the track width of a machine can include a width of the vehicle, a distance between co-axial wheels of the vehicle, a distance between tracks of the vehicle, and the like. In some embodiments, the height of the virtual plane is not affected by the track width of the machine 100 if the machine is moving towards a detected ground plane at a perpendicular angle. In such embodiments, the height of the virtual plane may vary if a first wheel, track, or side of the vehicle is approaching a detected ground plane more quickly than an opposite wheel, track, or side of the vehicle.

After the plane module 320 has determined the ground plane and virtual plane, the object identification model 325 identifies pixels corresponding to objects in the disparity image (referred to as "obstruction pixels"). Here, obstructions pixels are sets of pixels with 3D coordinates outside (i.e., above or below) of the ground plane in the image data. The obstruction pixels represent objects in the image that are obstructions for the machine 100. Obstruction pixels may be above or below the detection ground plane (e.g., a boulder or a deep trench).

To identify obstructions, the object identification model 325 bins obstruction pixels having approximately the same x- and y-image coordinates into groups. Each group has corresponding 3D z-coordinates which are outside of the ground plane. In an example, the object identification model 325 may employ k-means clustering to identify and group obstruction pixels having similar x- and y-coordinates with z-coordinates above or below the ground plane. In another example, the object identification model 325 may employ a connected components routine to group pixels.

The object identification model 325 creates a representation of each group of obstruction pixels. In an example configuration, the representation is a tube that projects out from the detection ground plane in the z-direction or along the vertical axis, but could be some other representation of the obstruction. In some embodiments, the object identification model 325 only makes tubes that are sufficiently tall to be identified as an obstruction (i.e., reach a threshold height above the ground plane). The object identification model 325 then flags each tube as an obstruction in the field portion because they are above a threshold height and may impede the machine 100. Each flagged tube is associated with a specific set of coordinates and height. The object identification model 325 sends the flagged tubes (i.e., obstructions) to the object map generator 330.

The object identification model 325 may update the ground plane and identify more obstructions as the machine 100 moves through the field. In particular, as the machine 100 reverses into the area behind the machine 100, the image data may show more (or different) parts of the field than the original field portion. In this case, the object identification model 325 may extrapolate the ground plane to the new parts of the field, or extrapolate a new ground plane, and detect other obstructions in the new or different parts. The object identification model 325 may also reevaluate the ground plane and obstructions on a continual, or semi continual basis. This is useful because, in some cases, the image data may show an object far away from the machine 100 as a small object, whereas, in reality, the object is large and would obstruct the machine 100.

The object identification model 325 may further label binned pixels as static or dynamic obstacles. For instance, the object identification model 325 may input pixels corresponding to obstructions into a machine learning model which classifies the pixels as corresponding to static obstructions (i.e., rocks, plants, buildings, etc.) or dynamic obstructions (people, cows, dogs, vehicles, etc.). A machine learning model may be trained on labelled image data of static and dynamic obstructions. In another example, the object identification model 325 may receive multiple set of image data at periodic time intervals as the machine 100 traverses the field and compares locations of obstructions in each set of image data to determine if the obstructions are static or dynamic.

In some embodiments, the object identification model 325 additionally uses a combination of a deep neural network (DNN) and fusion on the image data to flag further obstructions in the field portion. The DNN may label each obstruction (e.g., "cow," "rock," "hay," etc.) and, based on the labels, classify the obstructions as static or dynamic. For example, an obstruction labeled as a "cow" would be dynamic, while an obstruction labelled as "corn stalk" would be static. The DNN may include multiple layers between an input layer and an output layer that define a mathematical relationship between the input and output. The object identification model 325 may send the obstructions determined by the DNN with fusion to the object map generator 330.

Rather than flagging obstructions in the image data, in some embodiments, the object identification model 325 labels pixels in the ground plane as "drivable" or "not drivable" for the machine 100. In particular, the object identification model 325 determines x- and y-image coordinates of obstructions and labels areas of the ground plane with corresponding x- and y-coordinates as "not drivable." The object identification model 325 may label the remaining pixels of the ground plane as "drivable."

The object identification model 325 sends identified objects in the area behind the machine 100 to the object map generator 330. The object map generator 330 masks pixels corresponding to certain objects to generate an object map that highlights the locations of a subset of all the objects identified by the object identification model 325.

To generate the object map, the object map generator 330 applies the virtual plane to the disparity image. The object map identifies locations within the area behind the machine 100, of objects greater than a threshold size and greater than a height of the virtual plane and/or less than a height of the virtual plane. In effect, the object map identifies objects (which may include voids like trenches) that the machine 100 is at risk of hitting if the machine reverses into the area behind the machine 100. The user of the machine 100 may specify the threshold size and/or height above or below the virtual plane (or planes) that will trigger identification of an object or void.

In one embodiment, the object map generator 330 masks pixels of the disparity image corresponding to a portion of the area behind the machine 100 that is above a threshold distance away from the machine 100. For example, the object map generator 330 may mask pixels of the disparity image corresponding to objects behind the machine 100 that are over 20 feet away. In another embodiment, the object map generator 330 masks pixels of the disparity image corresponding to objects below a threshold size and less than the height of the virtual plane. These objects are assumed to not be an obstruction for the machine 100 as it moves through the area behind the machine 100. For instance, smaller objects, such as weeds, bushes, and/or rocks, may clear the underside of the machine 100. Additionally, smaller, lower level objects may actually be inflections and undulations in the ground that do not pose a risk to the machine 100. By masking objects below a threshold size and less than the height of the virtual plane, the object map generator 300 prevents the machine 100 from unnecessarily stopping or rerouting to avoid small objects. The user may specify the threshold distance, object size, and/or height.

In some embodiments, the user may specify objects for the object map generator 330 to mask, based on the objects identified by the object identification model 325. For example, the user may instruct the object map generator 330 to mask pixels corresponding to bushes and short plants, whereas pixels corresponding to boulders and people should remain unmasked.

The object map generator 330 thus generates an object map, in which pixels of the disparity image corresponding to certain objects remain unmasked. The object map specifies locations of each of the objects (e.g., in some embodiments this includes using the GPS data collected by the camera array 210 and component array 220).

The machine 100's control system 130 uses the generated object map to navigate the machine 100. When the machine 100 reverses into the area behind the machine 100, the control system 130 identifies objects on the object map that are in close proximity to the machine 100 (e.g., within a threshold distance of the machine 100). The control system 130 alerts the user of the machine 100 of the object, for example, by providing the user with audio and/or visual notifications. In other embodiments, the control system 130 may cause the machine 100 to brake, slow down, reroute its path across the field, or some combination thereof.

The datastore 340 stores information relevant to the machine 100. This may include, for example, images captured by the camera array 210, information captured by the component array 220, generated disparity images, 3D models and/or point clouds, virtual planes, object identification models, and so on. In some embodiments, the datastore 340 is implemented on a computing system local to the machine 100. In other embodiments, the datastore 340 is remote or cloud-based. The datastore 340 is updated as the machine 100 traverses through the field.

IV. EXAMPLE OBJECT MAP GENERATION

Figure 4:
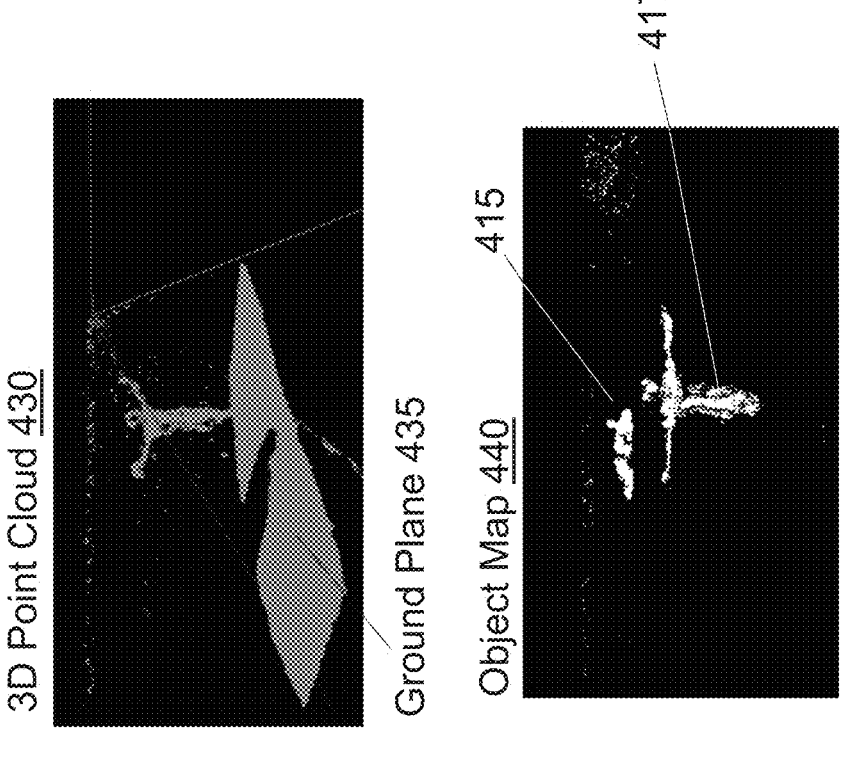
FIG. 4 depicts generation of an object map, in accordance with an embodiment.
Figure 4:
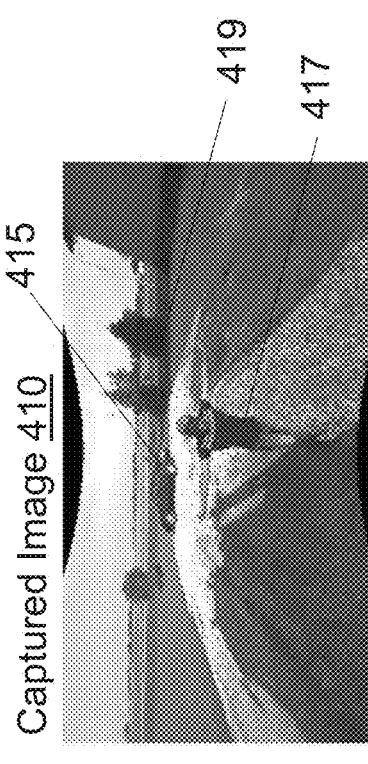
Figure 4:
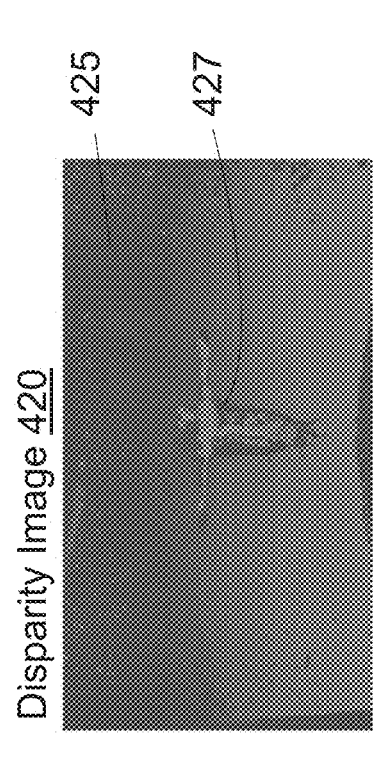

FIG. 4 depicts generation of an object map, in accordance with an embodiment. The camera array 210 of the machine 100 captures an image 410 of an area behind the machine 100. The camera array 210 may capture multiple images that the control system 130 combines into the captured image 410. The captured image 410 includes various objects located in the area behind the machine 100, such as a car 415, a person 417, and a tree 419. In some embodiments, the captured image 410 may be of an area in front of, or to the left and/or right of the machine 100.

The control system 130 generates a disparity image 420. The disparity image 420 includes representations of depth. Portions of the area behind the machine 100 that are a threshold distance away from the machine 100, such as portion 425, differ in representation than portions close to the machine 100, such as portion 427. In this example, the person 417 is closer to the machine 100 than the car 415 and the tree 419, and accordingly, the pixels corresponding to the person 417 are colored differently than the pixels corresponding to the car 415 and the tree 419.

The control system 130 generates a 3D point cloud 430 from the disparity image 420. The control system 130 performs a RANSAC operation on the 3D point cloud 430 to identify a ground plane 435, and also generates a virtual plane parallel to the identified ground plane. The control system 130 dynamically generates the virtual plane as the machine 100 moves around the field, since the height of the virtual plane depends on one or more of the geometric dimensions of the vehicle including maximum operational pitch, maximum clearance height, the track width of the machine 100, and the dynamically changing height, location, and orientation of the identified ground plane.

The control system 130 employs the object identification model 325 to identify the objects in captured image 410. The control system 130 applies the virtual plane to the disparity image to create an object map 440 that only includes certain objects. In doing so, the control system 130 masks pixels of objects that are lower than a threshold size, lower than the height of the virtual plane, and/or greater than a distance away from the machine 100. For example, in the object map 440, only pixels corresponding to the car 415 and the person 417 are visible, while pixels corresponding to the tree 417 and other objects are masked. The control system 130 may find there is greater risk in the machine 100 colliding with the person 417 and/or the car 415 than in colliding with the tree 419. In some embodiments, the control system 130 also knows the GPS locations of these objects, based on sensor data collected by the component array 220. The control system 130 uses this object map, as well as the locations of the objects on the map, to navigate the machine 100.

FIG. 5 illustrates a process for generating an object map for use in a machine navigation system, in accordance with an embodiment. A set of cameras (e.g., the camera array 210) mounted on a rear side of a machine (e.g., the machine 100, which may be a farming machine and/or a construction vehicle) captures 500 a set of images of an area behind the machine, for instance in response to an instruction to navigate the machine backwards.

The machine generates 520 a disparity image (e.g., the disparity image 420) for instance by combining the set of images, where the disparity image's pixels each represent a distance between the machine and a portion of the area behind the machine. The machine generates 530 a 3D point cloud (e.g., the 3D point cloud 430) comprising a 3D model of the area behind the machine, for instance based on the generated disparity.

The machine identifies 540 a ground plane (e.g., the ground plane 435) corresponding to a ground surface of the area behind the machine, for instance by performing a random sample consensus (RANSAC) operation on the 3D point cloud. The machine generates 550 a virtual plane parallel to the identified ground plane at a height determined based on one or more of the geometric dimensions of the vehicle including maximum operational pitch, maximum clearance height, the track width of the machine 100, and the dynamically changing height, location, and orientation of the identified ground plane.

The machine generates 560 an object map (e.g., the object map 440) by applying the virtual plane to the disparity image, wherein the object map identifies locations within the area behind the machine that have objects above a threshold size and greater than a height of the virtual plane. The machine navigates 570, for instance autonomously, through the area behind the machine using the object map.

V. ADDITIONAL CONSIDERATIONS

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method comprising:

capturing, by a set of cameras mounted on a rear side of a construction vehicle, a set of images of an area behind the construction vehicle;

generating, by the construction vehicle, a disparity image of the area behind the construction vehicle by combining the set of images, each pixel of the disparity image representing a distance between the construction vehicle and a portion of the area behind the construction vehicle;

generating, by the construction vehicle, a 3D point cloud comprising a 3D model of the area behind the construction vehicle;

identifying, by the construction vehicle, a ground plane corresponding to a ground surface of the area behind the construction vehicle by performing a random sample consensus (RANSAC) operation on the 3D point cloud;

generating, by the construction vehicle, a virtual plane parallel to the identified ground plane at a height above the ground plane selected based on a combination of:
   1) a clearance height under the construction vehicle,
   2) a pitch angle determined based on a height of a rear portion of the construction vehicle and a location of the rear portion of the construction vehicle relative to a wheel of the construction vehicle, and
   3) an orientation, location, and height of the identified ground plane;

generating, by the construction vehicle, an object map by masking pixels of the disparity image corresponding to objects in the area behind the construction vehicle that are below a threshold size and less than a height of the virtual plane; and navigating, by the construction vehicle, within the area behind the construction vehicle using the generated object map.

2. The method of claim 1, further comprising:

responsive to navigating within the area behind the construction vehicle and responsive to identifying an object from the object map within a threshold distance from the construction vehicle, alerting, by the construction vehicle, an operator of the construction vehicle.

3. The method of claim 2, wherein alerting the operator comprises engaging, by the construction vehicle, one or more brakes of the construction vehicle.

4. The method of claim 1, further comprising masking pixels of the disparity image corresponding to a portion of the area behind the construction vehicle that is greater than a threshold distance away from the construction vehicle.

5. The method of claim 1, wherein the height of the virtual plane is based further on a track width of the construction vehicle.

6. The method of claim 1, wherein the object map identifies a location within the area behind the construction vehicle of each object above the threshold size and greater than the height of the virtual plane.

7. A non-transitory computer-readable storage medium storing executable instructions that, when executed by a hardware processor, cause the hardware processor to perform steps comprising:

capturing, by a set of cameras mounted on a rear side of a construction vehicle, a set of images of an area behind the construction vehicle;

generating, by the construction vehicle, a disparity image of the area behind the construction vehicle by combining the set of images, each pixel of the disparity image representing a distance between the construction vehicle and a portion of the area behind the construction vehicle;

generating, by the construction vehicle, a 3D point cloud comprising a 3D model of the area behind the construction vehicle;

identifying, by the construction vehicle, a ground plane corresponding to a ground surface of the area behind the construction vehicle by performing a random sample consensus (RANSAC) operation on the 3D point cloud;

generating, by the construction vehicle, a virtual plane parallel to the identified ground plane at a height above the ground plane selected based on a combination of:
   1) a clearance height under the construction vehicle,
   2) a pitch angle determined based on a height of a rear portion of the construction vehicle and a location of the rear portion of the construction vehicle relative to a wheel of the construction vehicle, and
   3) an orientation, location, and height of the identified ground plane;

generating, by the construction vehicle, an object map by masking pixels of the disparity image corresponding to objects in the area behind the construction vehicle that are below a threshold size and less than a height of the virtual plane; and reverse navigating, by the construction vehicle, within the area behind the construction vehicle using the generated object map.

8. The non-transitory computer-readable storage medium of claim 7, wherein the instructions further cause the hardware processor to perform steps comprising:

responsive to navigating within the area behind the construction vehicle and responsive to identifying an object from the object map within a threshold distance from the construction vehicle, alerting, by the construction vehicle, an operator of the construction vehicle.

9. The non-transitory computer-readable storage medium of claim 8, wherein the instructions that cause the hardware processor to alert the operator of the construction vehicle further cause the hardware processor to perform steps comprising engaging, by the construction vehicle, one or more brakes of the construction vehicle.

10. The non-transitory computer-readable storage medium of claim 7, wherein the instructions further cause the hardware processor to perform steps comprising masking pixels of the disparity image corresponding to a portion of the area behind the construction vehicle that is greater than a threshold distance away from the construction vehicle.

11. The non-transitory computer-readable storage medium of claim 7, wherein the height of the virtual plane is half of a height of the 3D point cloud.

12. The non-transitory computer-readable storage medium of claim 7, wherein the height of the virtual plane is based further on a track width of the construction vehicle.

13. The non-transitory computer-readable storage medium of claim 7, wherein the object map identifies a location within the area behind the construction vehicle of each object above the threshold size and greater than the height of the virtual plane.

14. A navigation system for a construction vehicle comprising:

a hardware processor; and a non-transitory computer-readable storage medium storing executable instructions that, when executed, cause the hardware processor to perform steps comprising:

capturing, by a set of cameras mounted on a rear side of a construction vehicle, a set of images of an area behind the construction vehicle;

generating, by the construction vehicle, a disparity image of the area behind the construction vehicle by combining the set of images, each pixel of the disparity image representing a distance between the construction vehicle and a portion of the area behind the construction vehicle;

generating, by the construction vehicle, a 3D point cloud comprising a 3D model of the area behind the construction vehicle;

identifying, by the construction vehicle, a ground plane corresponding to a ground surface of the area behind the construction vehicle by performing a random sample consensus (RANSAC) operation on the 3D point cloud;

generating, by the construction vehicle, a virtual plane parallel to the identified ground plane at a height above the ground plane selected based on a combination of:

1) a clearance height under the construction vehicle, 2) a pitch angle determined based on a height of a rear portion of the construction vehicle and a location of the rear portion of the construction vehicle relative to a wheel of the construction vehicle, and 3) an orientation, location, and height of the identified ground plane;

generating, by the construction vehicle, an object map by masking pixels of the disparity image corresponding to objects in the area behind the construction vehicle that are below a threshold size and less than a height of the virtual plane; and navigating, by the construction vehicle, within the area behind the construction vehicle using the generated object map.

15. The navigation system of claim 14, wherein the instructions further cause the hardware processor to perform steps comprising:

responsive to navigating within the area behind the construction vehicle and responsive to identifying an object from the object map within a threshold distance from the construction vehicle, alerting, by the construction vehicle, an operator of the construction vehicle.

16. The navigation system of claim 15, wherein the instructions that cause the hardware processor to alert the operator of the construction vehicle further cause the hardware processor to perform steps comprising engaging, by the construction vehicle, one or more brakes of the construction vehicle.

17. The navigation system of claim 14, wherein the instructions further cause the hardware processor to perform steps comprising masking pixels of the disparity image corresponding to a portion of the area behind the construction vehicle that is greater than a threshold distance away from the construction vehicle.

18. The navigation system of claim 14, wherein the object map identifies a location within the area behind the construction vehicle of each object above the threshold size and greater than the height of the virtual plane.

* * * * *